July 5, 1932.  H. HANSEN  1,866,034
KEY CUTTING APPARATUS
Filed March 28, 1927  7 Sheets-Sheet 1
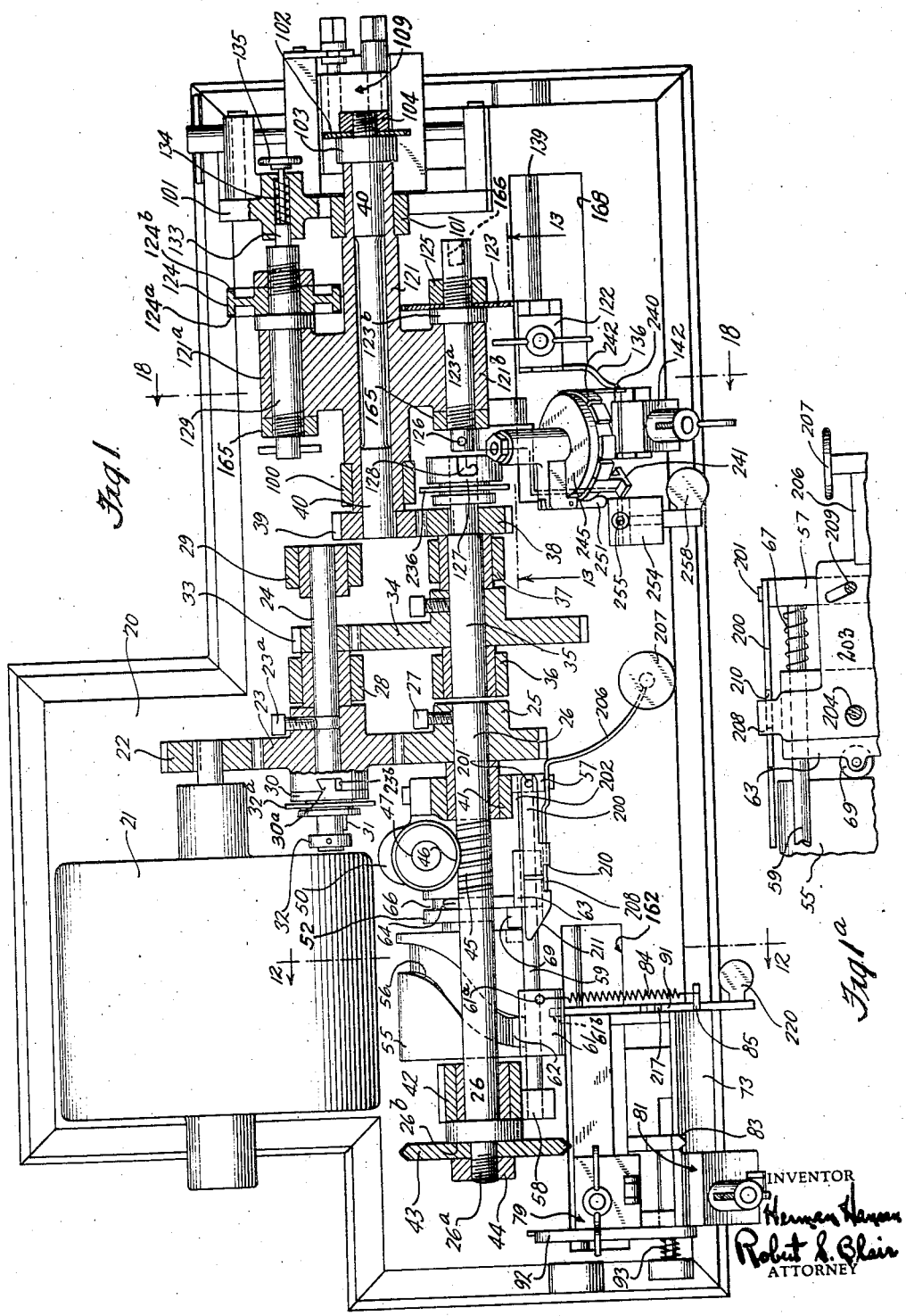
INVENTOR
Herman Hansen
Robert L. Blair
ATTORNEY

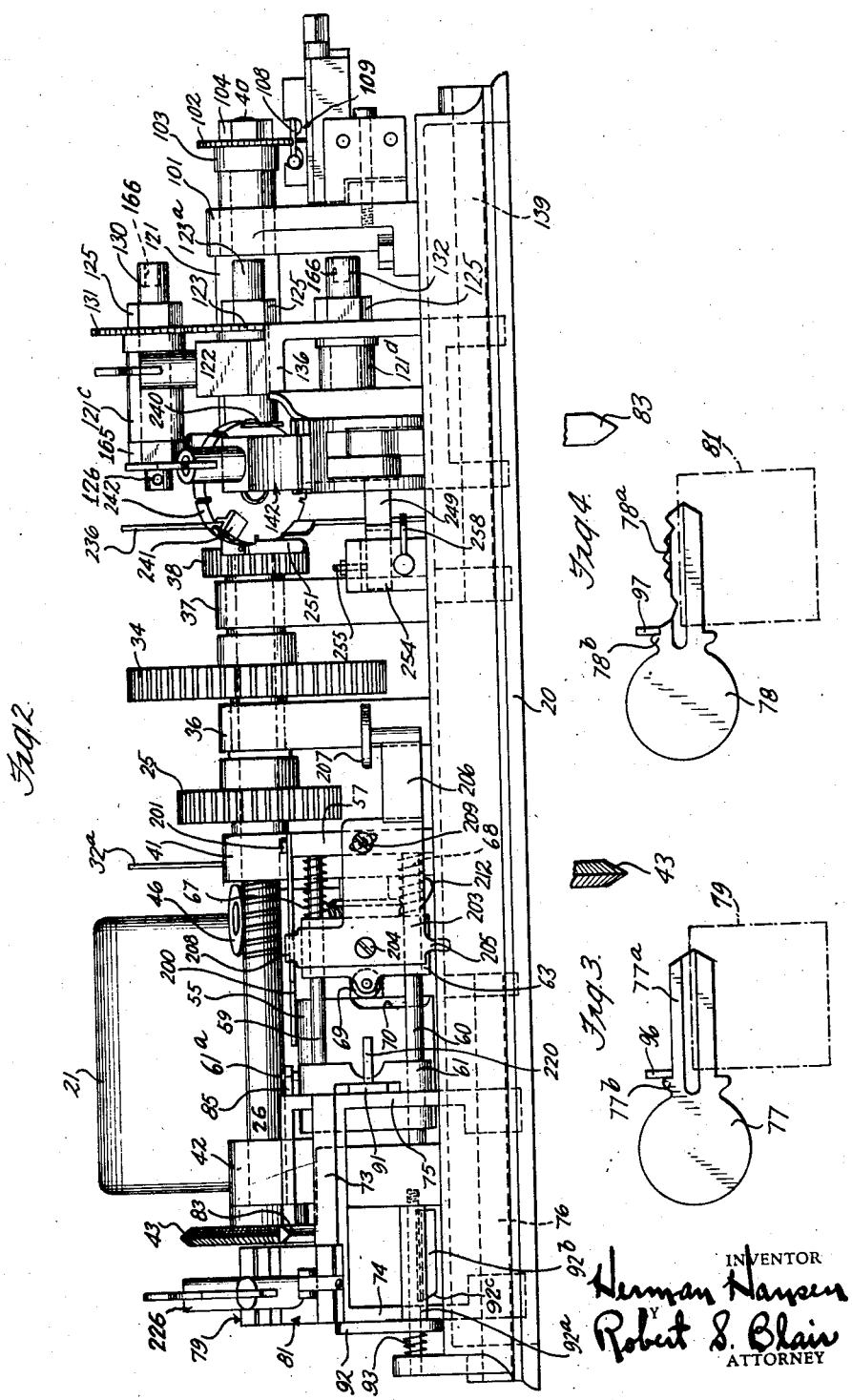

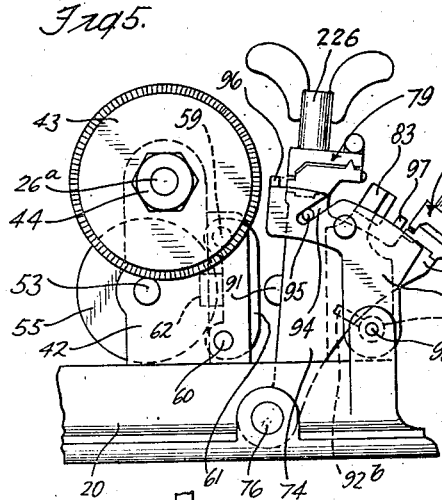

July 5, 1932.   H. HANSEN   1,866,034
KEY CUTTING APPARATUS
Filed March 28, 1927   7 Sheets-Sheet 4
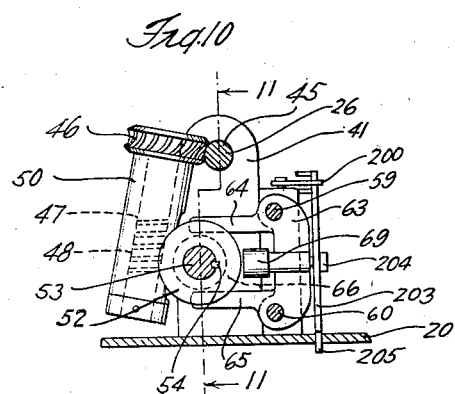
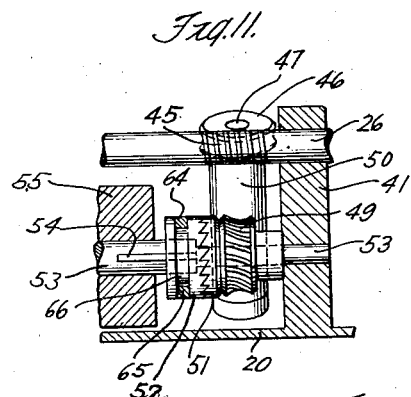
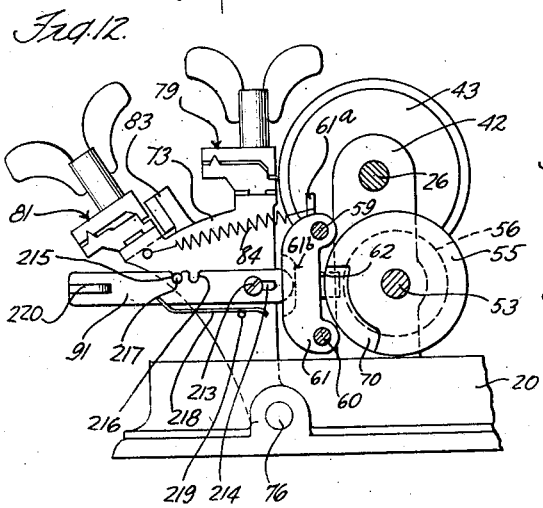
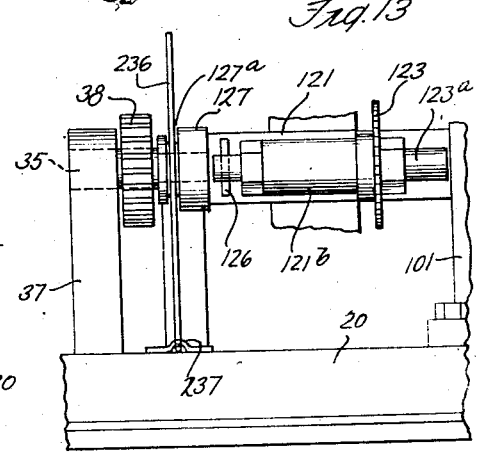
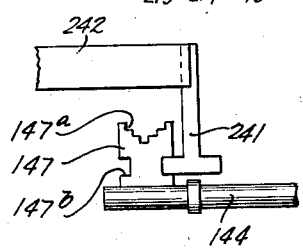
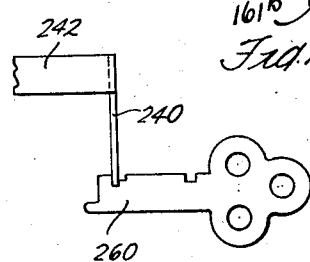
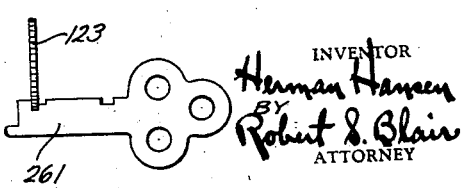
INVENTOR
Herman Hansen
BY Robert S. Blair
ATTORNEY

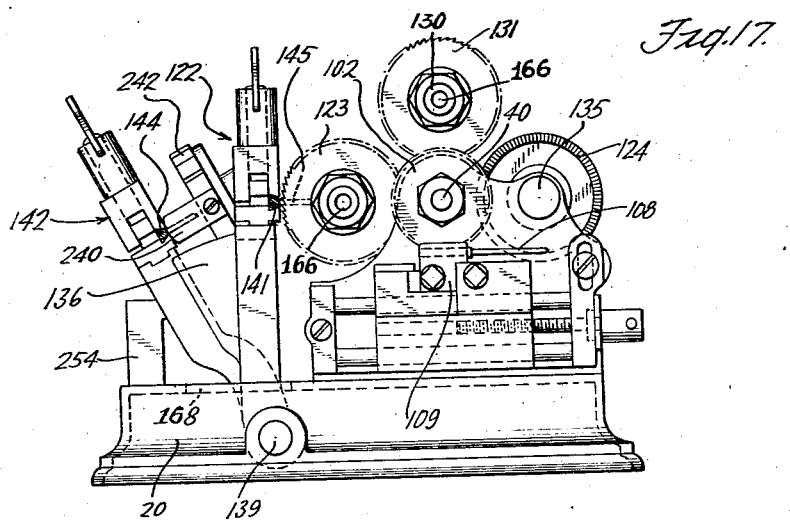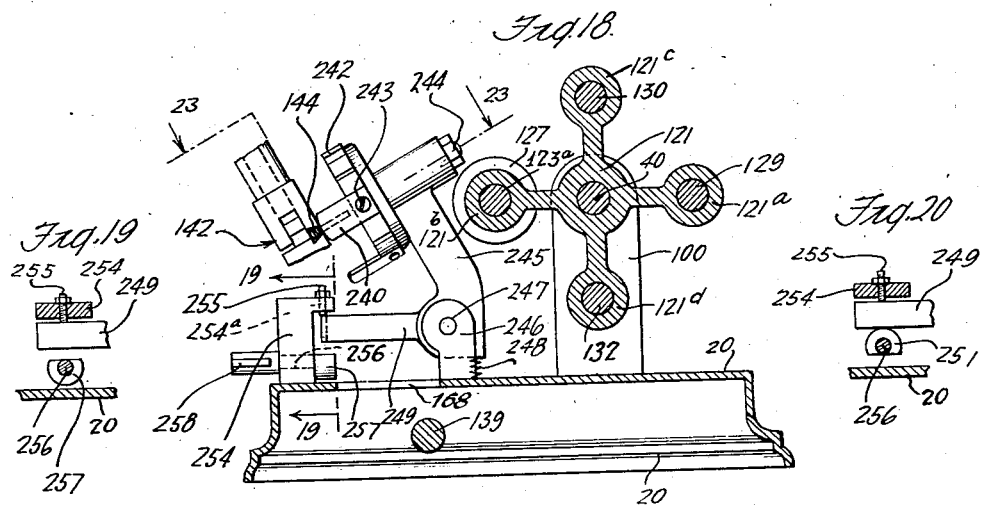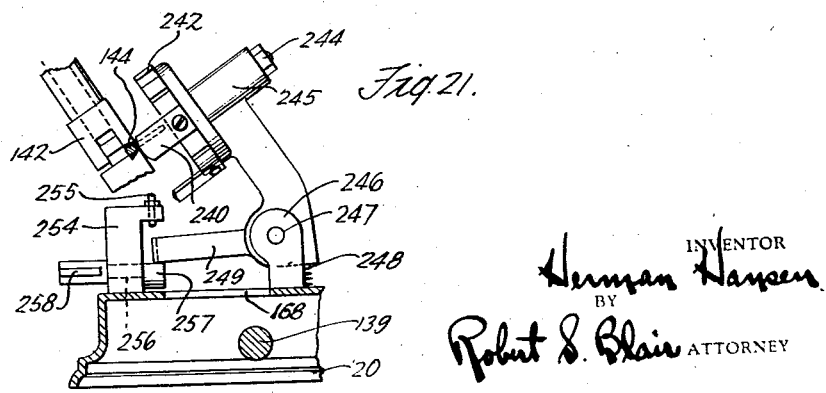

July 5, 1932.  H. HANSEN  1,866,034
KEY CUTTING APPARATUS
Filed March 28, 1927  7 Sheets-Sheet 6
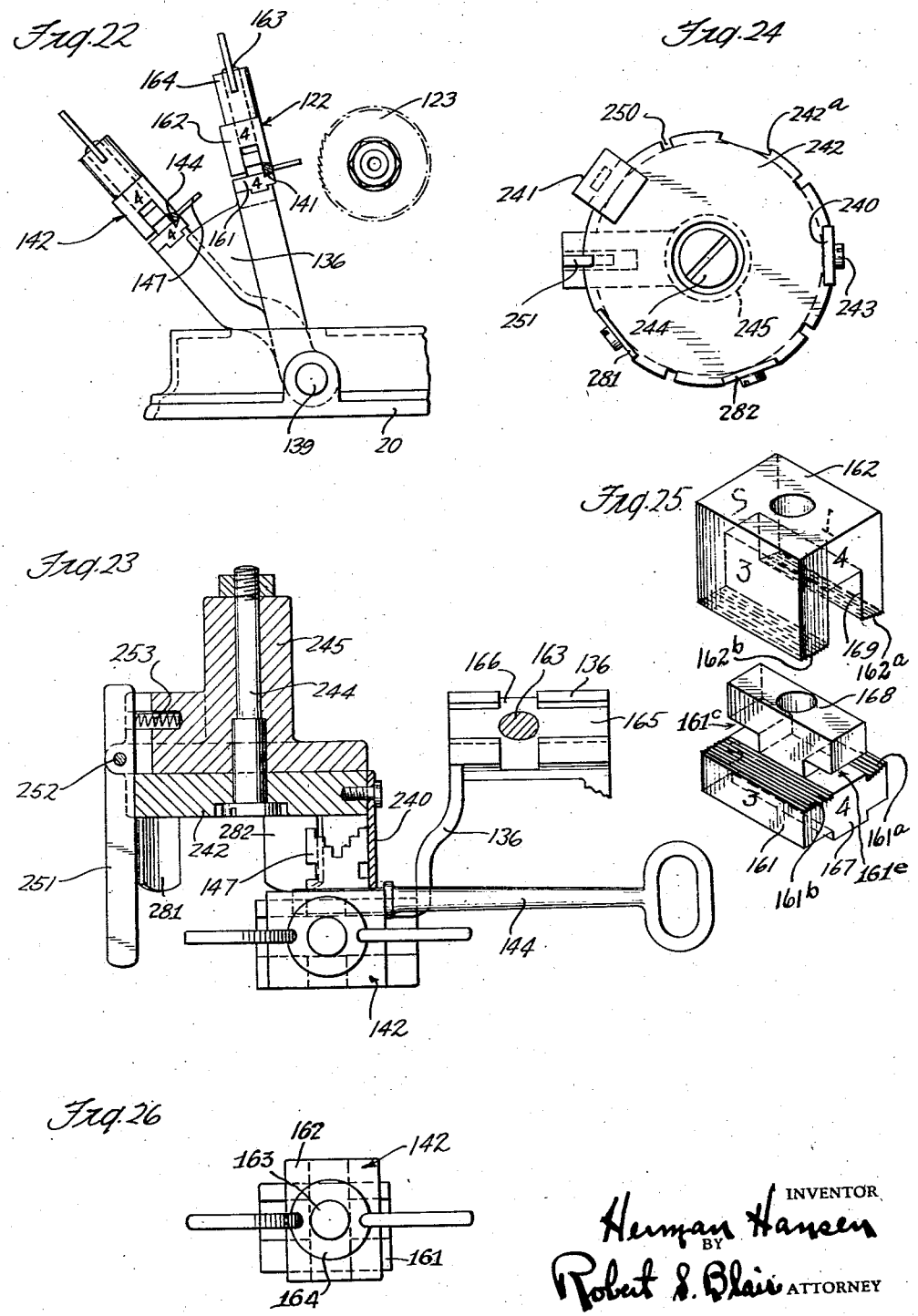

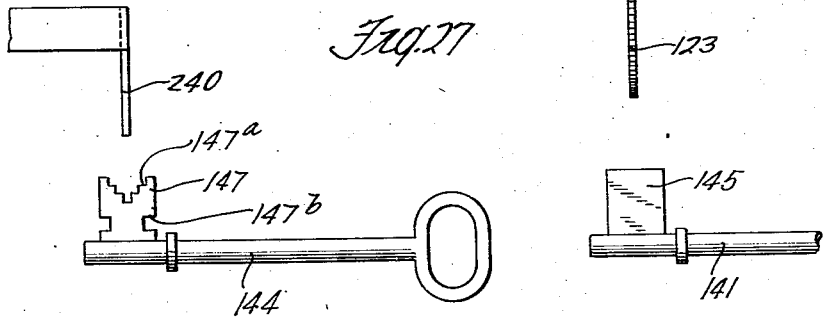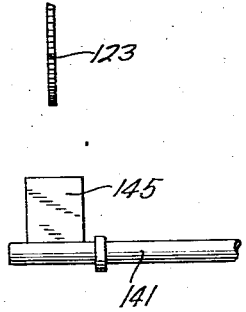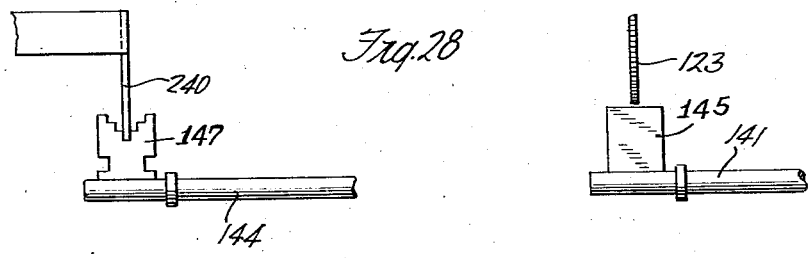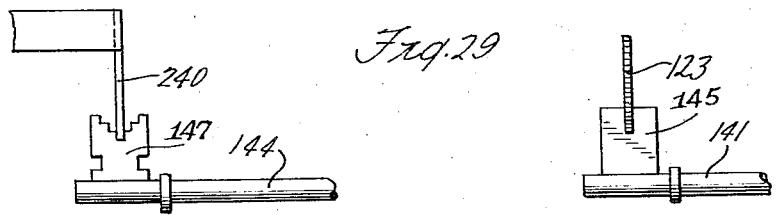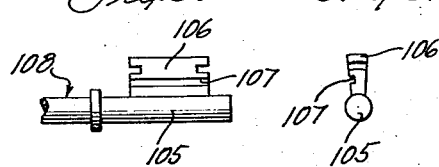

Patented July 5, 1932

1,866,034

UNITED STATES PATENT OFFICE

HERMAN HANSEN, OF NEW YORK, N. Y., ASSIGNOR TO FRANCIS KEIL & SON, INC., A CORPORATION OF NEW YORK

KEY CUTTING APPARATUS

Application filed March 28, 1927. Serial No. 178,953.

This invention relates to apparatus for cutting keys. One of the objects thereof is to provide a key cutting machine which is practical and efficient and capable of meeting the various requirements of practical use in a highly satisfactory manner. Another object is to provide a machine of the above nature which is capable of a wide range of use. Another object is to provide a machine of the above nature in which various types of keys may be cut or shaped with rapidity and accuracy. Another object is to provide a machine of the above nature which is convenient to operate and in which adjustments to make various cuts are accomplished with the greatest ease. Another object is to provide a machine of the above nature in which the keys to be cut and the master keys to be copied may be conveniently positioned accurately in their holding devices. Another object is to provide a machine of the above nature which is rugged and serviceable. Another object is to provide a machine of the above nature which is compact in construction. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which is shown one of the various possible embodiments of this invention, Figure 1 is a top plan view of the apparatus with certain parts shown in horizontal section;

Figure 1ª is a front elevation of a latch mechanism for operating a clutch, the latch being shown in operative position;

Figure 2 is a front elevation of the machine;

Figure 3 shows diagrammatically a key blank positioned in relation to certain parts of the machine;

Figure 4 shows certain parts of the apparatus in relation to a master key or guide key which is to be followed in cutting the key blank of Figure 3;

Figure 5 is a partial end elevation showing parts of the machine as viewed from the left of Figure 2;

Figure 6 is a view similar to Figure 5 but showing the parts in a different position;

Figure 7 is a vertical sectional view in enlarged detail of a key holding device which is shown in Figures 5 and 6;

Figure 8 is a view similar to Figure 7 but showing the parts of the device in a different position;

Figure 9 is a front elevation of parts viewed from the right-hand side of Figure 8;

Figure 10 is a detached detail view of parts of the driving apparatus;

Figure 11 is a vertical sectional view taken along the line 11—11 of Figure 10;

Figure 12 is a vertical sectional view taken along the line 12—12 of Figure 1;

Figure 13 is a fragmentary front elevational view of a clutch mechanism taken as seen along the line 13—13 of Figure 1;

Figure 14 is a diagrammatic view illustrating the cutting of a notch in the side edge of the bit of a barrel key;

Figure 15 is a diagrammatic view illustrating the cutting of a notch in a flat key;

Figure 16 shows the manner in which the key of Figure 15 is held for the cutting operation;

Figure 17 is an end elevation of the machine viewed from the right-end of Figure 1;

Figure 18 is a vertical section taken along the line 18—18 of Figure 1;

Figure 19 is a vertical section taken along the line 19—19 of Figure 18;

Figure 20 is a view similar to Figure 19 but showing the parts in a different position;

Figure 21 is a view similar to the left-hand portion of Figure 18 and showing the parts in a different position;

Figure 22 is a view similar to the left-hand portion of Figure 17 with the key drawn back from the tool and with certain parts omitted to permit a clearer showing;

Figure 23 is an enlarged sectional view as seen substantially along the line 23—23 of Figure 18 showing the parts in larger detail;

Figure 24 is a front elevation of one of the parts shown in Figure 23;

Figure 25 is a perspective view of portions of a key clamping device shown in Figure 23;

Figure 26 shows the same key clamping device in a position other than that assumed thereby in Figure 23;

Figures 27, 28 and 29 are diagrammatic views illustrating the cutting of a notch in the front edge of the bit of a key blank of the barrel type;

Figure 30 is a side elevation of the bit portion of a barrel key, and

Figure 31 is an end view of the key shown in Figure 30.

Similar reference characters refer to similar parts throughout the several views of the drawings.

Referring now to the drawings in detail and first to Figure 1, this key cutting apparatus is shown as being mounted upon a suitable platform or base 20 and driven by an electric motor 21. It will be understood, of course, that any other suitable form of power drive may be substituted for the motor. Upon the armature shaft of the motor 21 is shown a gear 22 which meshes with a gear 23 loosely rotating upon a shaft 24. This gear 23 meshes with a gear 25 which is fixed upon a shaft 26, for example, by means of a set screw 27. A set screw 23a threaded into the hub of the gear 23 engages with a circumferential groove in the surface of the shaft 24 and prevents longitudinal movement of the gear 23 along the shaft 24 while permitting relative rotation of these parts. The shaft 24 is rotatably supported in bearing supports 28 and 29 and may be connected in driving relation with the gear 23 or disconnected therefrom by means of a clutch member 30. This member 30 is slidable longitudinally of the shaft 24 and splined thereto by a key 31 and has a member 30a which forms the male member of a clutch of which the hub of the gear 23, suitably recessed as at 23b, is the female part. In the position shown in the drawings the clutch 30 is operative to connect the shaft 24 in driving relation with the gear 23. In order to disconnect the drive of the shaft 24 the member 30 is slid back along the shaft, thus disengaging member 30a from the recessed hub, and is slid against a fixed collar 32. For convenient operation of this clutch there is provided a lever 32a which is pivoted at its lower end to the base 20 and which is operated as will be made clear hereinafter.

The shaft 24 has fixed thereon a gear 33 meshing with a gear 34 which is fixed upon a shaft 35 supported in bearings 36 and 37. The shaft 35 has fixed thereon a second gear 38 which meshes with a gear 39, this latter gear being fixed upon a shaft 40. The functions of these parts just described will later be gone into in detail. From the above, however, it will be seen that the shaft 26 is continually connected in driving relation with the motor 21 and that the shaft 35 may be connected or disconnected from the drive of the motor as desired through the clutch mechanism 30. It will be noted that this driving mechanism just described makes for a very compact and simple arrangement of the various parts.

Considering now the shaft 26, this shaft is rotatably supported in bearing posts 41 and 42, and at its left-hand end carries a circular cutting tool 43. This tool is held in place upon the reduced end portion 26a of the shaft and up against a shoulder 26b by means of a nut 44, and is thus removable and replaceable by other tools by simply removing the nut. The cutting tool 43 is rapidly rotated by its drive from the motor 21.

At its portion adjacent the bearing 41, the shaft 26 has formed thereon a thread or worm 45 with which engages a worm wheel 46. Referring to Figures 10 and 11, these parts are shown more in detail. The worm wheel 46 is fixed upon a shaft 47 which extends downwardly and has formed thereon a thread or worm 48 meshing with a worm wheel 49. Preferably the shaft 47 is encased in a casing 50 having therein an opening for the entrance of the worm wheel 49, the casing 50 forming a support and thrust bearing for the shaft. As best shown in Figure 11, the worm wheel 49 is mounted to rotate freely on a shaft 53 which is rotatably supported at its right-hand end in the post 41. On the left-hand face of this worm wheel is a clutch member 51 which may be formed integral with the worm wheel. A clutch member 52 is adapted to mate with the clutch member 51. This clutch member 52 is slidably mounted upon the shaft 53 and splined thereto by a suitable key 54. Thus the shaft 53 is adapted to be slowly rotated through the worm drive from the shaft 26. The drive of the shaft 53 may be thrown in or out by means of the clutch 52—51.

The shaft 53 carries thereon a cylinder 55 having in its cylindrical outer surface a cam groove 56 (Figure 1). As shown in Figures 1 and 2 and also in Figure 5, extending between and supported by a pair of uprights 57 and 58 conveniently positioned to the front of posts 41 and 42 respectively are a pair of horizontal rods 59 and 60. Slidably mounted upon these rods is a member 61 which carries upon its side facing the cam 55 a roller 62. This roller 62 (see Fig. 1) engages with the slot 56 in the surface of the cam 55, the cam slot being shaped to move the member 61 back and forth along the supporting rods 59 and 60. In the position shown in the drawings, the member 61 is at its extreme left-hand position. The groove 56 extends all the way around the cam 55 and is shaped to impart a uniform movement to the member 61. Starting from the position shown in the drawings, it will be seen that a complete rotation of the cam 55 will move the member 61 to the right and back again to its initial position.

Also mounted upon the supporting rods 59 and 60 to the right of the member 61 is a second slidable member 63 which is shown in detail in Figure 10. This member 63 is provided with a pair of inwardly projecting arms 64 and 65 which engage with a circumferential groove 66 formed in the slidable clutch member 52 (Figure 11). In the position shown in the drawings, the clutch member 52 is moved to the right to its position of engagement with the clutch member 51 to transmit drive to the cam 55. It will be seen that a movement of the member 63 to the left will, through the arms 64 and 65 disengage the clutch member 52 from the member 51, and halt the rotation of cam 55.

As best shown in Figure 2, there are provided about the supporting rods 59 and 60 at the right of the member 63 a pair of compression springs 67 and 68 which continually urge the member 63 to the left and hence urge the clutch member 52 toward the position of disengagement. The member 63 carries a roller 69 which is adapted to engage the right-hand end surface of the cam 55 adjacent the edge thereof. This engagement of the cam 55 with the roller 69 is adapted to hold the member 63 to the right against the action of the springs 67 and 68 and thus hold the clutch member 52 in position of engagement with member 51 at all times except when the cam is in such position of its rotation that it has moved the member 61 to its extreme left position, as shown in the drawings. At this point a recess 70 formed in the end surface of the cam 55 comes opposite the roller 69 and permits the member 63 to move to the left under the action of the springs 67 and 68, disengaging the clutch member 52 from member 51.

As is best shown in Figure 1, there is provided above the member 63 a horizontal arm 200 which is pivoted about a vertical screw 201 in the top of the upright 57. This arm is urged to swing outwardly toward the front of the machine by a leaf spring 202. As shown in Figure 1a and also in Figure 2, against the front surface of the member 63 is positioned a member 203 which is fastened thereto by a screw 204. Adjacent its left-hand end this member 203 is provided with a downwardly projecting lug 205 which enters an opening (see Figure 10) in the surface of the base 20, thus forming in effect a pivot about which the member 203 may swing. The right-hand end of the member 203 has an arm 206 which extends outwardly toward the front of the machine and is provided at its outer end with a button 207. By depressing the button 207, the upper portion 208 at the left-hand end of the member 203 is swung to the right, swinging about the lug 205. This movement is imparted to the member 63 and the roller 69 through the connecting screw 204. In order to support the member 203 and to guide it in its swinging movement, there is provided a screw 209 which passes through a slot in the member 203 and enters the upright 57.

As shown in Figure 1, the front edge of the arm 200 has therein a notch 210 which is adapted to receive and hold the upper end portion 208 of the member 203. Also, the left-hand end of the arm 200 is inclined or beveled as shown at 211. In the position of the parts shown in the drawing, the part 208 of the member 203 is in engagement with the notch 210. As will be seen from the drawings, this notch is so positioned that it holds the member 203 and the member 63 therewith in such position that the roller 69 is held to the right and out of engagement with the recess 70 of the cam 55, against the action of the springs 67 and 68. The clutch member 52 is thus held in engagement with member 51, the arm 200 with its notch 210 serving as a latch which holds the clutch members in engagement against the action of the springs tending to disengage the clutch members.

In the operation of this apparatus, the initial positions of the cam 55 and of the sliding member 61 are as shown in the drawings, the member 61 being at its extreme left position. In such position of the parts, the recess 70 in the cam 55 is positioned opposite to the roller 69, but the roller 69 is held to the right by the latch 200 against the action of the springs 67 and 68, whereby the clutch members are held in engagement and the cam 55 is rotated. As the cam 55 rotates, the recess 70 moves out of registry with the roller 69 and the member 61 moves to the right. As the member 61 nears the end of its movement toward the right, the projecting pin 61a thereon (Figure 1) strikes the beveled end 211 of the latch 200 and swings the latch inwardly about the pivot screw 201. This releases the part 208 of the member 203 from the latch, and the roller 69 may now move to the left under the urge of the springs 67 and 68; however, at this point, the recess 70 of the cam has moved out of registry with the roller 69 and the end surface of the cam holds the member 63 to the right and holds the clutch members engaged, the drive of the cam now continuing without the assistance of the latch 200.

As shown in Figure 1a, the screw 204 which connects the member 203 with the member 63 is threaded into the member 63 and passes through an enlarged opening in the member 203. A leaf spring 212 (Figure 2) bearing against the top of the base 20 continually urges the member 203 to swing to the left (in counter-clockwise direction) about the lug 205. When the latch 200 is thrust back by the pin 61a, and the roller 69 comes against the end of the cam 55 to hold the clutch in against the action of the springs 67 and 68, as has been described, the spring 212 swings the member 203 to the left relative to the member 63 through a short distance permitted by the enlarged opening through which the screw 204 passes. This movement carries the upper portion 208 of the member 203 to the left beyond the edge of the notch 210, as shown in Figure 1a. Now as the member 61 moves back toward the left under the drive of the cam 55, moving the pin 61a out of engagement with the beveled end 211 of the latch, the latch 200 cannot swing back to let the part 208 enter into the recess 210. The member 61 continues its movement to the left with the end surface of the cam 55 alone holding the clutch members 51 and 52 in engagement against the action of the springs 67 and 68. When the cam has completed one rotation, moving the member 61 to the right and then back to the left to its initial position, the recess 70 again comes into registry with the roller 69, the member 63 moves to the left and with it one of the clutch members (see Fig. 11) and the clutch is disengaged to interrupt the drive of the cam. Thus, the member 61 will move to the right and back again to its initial position and stop.

The mechanism stops with the roller 69 resting in the recess 70, with the clutch member 52 disengaged from member 51 and with the part 208 of the member 203 moved to the left and out of registry with the recess 210 in the latch member 200. In order to again start the drive of the cam 55 and of the member 61, it is necessary simply to depress the button 207. This action swings the member 203 to the right, member 203 moving the member 63 through which the clutch member 52 is moved into engagement with the clutch member 51, and then also the latch 200 snaps into position to hold the clutch engaged, the swinging of member 203 bringing the part 208 thereof in line with the recess 210 of the latch 200. The member 61 then starts its movement to the right and the action described above is repeated, the member 61 moving to the right, then back to its initial position and stopping.

Mounted in front of the cutter 43 is a carriage 73 which is slidably supported by a pair of legs 74 and 75 (see Fig. 2) upon a longitudinal shaft or rod 76 which is mounted within the base 20, the legs 74 and 75 projecting downwardly through a slot 162 in the top of the base. This carriage 73 is thus movable longitudinally in a direction substantially parallel to the direction of movement of the member 61, and it is provided with means for supporting a key blank to be operated upon by the cutter 43 and with means for supporting a master key or guide key. Keys to be cut by the cutter 43 are of the type known as Yale keys or cylinder keys and in Figures 3 and 4 are illustrated a key blank 77 and a master key or guide key 78 of this type. The purpose of the cutting operation by the cutter 43 is accurately to reproduce in the key blank 77 the shape of the key 78.

As best shown in Figures 5 and 6, the key blank 77 to be cut is clamped in a clamping device mounted upon the carriage 73 and indicated generally by the numeral 79; the master key or guide key 78 is clamped upon the carriage 73 in a clamping device indicated generally by the numeral 81. The key blank 77 is clamped in the device 79 with its edge 77a facing toward the cutter 43, and the guide key 78 is clamped in position with its edge 78a facing a guide 83. The carriage 73 is capable of swinging, about the axis of shaft 76, toward and away from the cutter 43, and a spring 84 (Figure 1), stretched between a projecting pin 85 on the carriage 73 and the upright lug 61a on the sliding member 61, urges the carriage to swing inwardly toward the cutter 43. This spring thus urges the edge 77a of the key blank 77 against the cutter 43 and urges the edge 78a of the guide key 78 against the guide 83.

The guide 83 is seen in Figure 1 and also in Figures 5 and 6. Its mounting is not shown in detail herein since this feature is not of importance as relating to the present invention, but preferably the guide is mounted as shown in my co-pending application Serial No. 88,729, filed February 17, 1926, and is adjustable in position and interchangeable with other guides as described therein.

The carriage 73 carrying the key blank 77 and the guide key 78 is adapted to be moved back and forth upon the supporting shaft 76 by connection with the member 61 which is driven from the cam 55 as before described. The driving connection between the carriage 73 and the member 61 preferably comprises an arm 91 (shown in Figures 1, 2 and 12), which is mounted upon the right-hand end of the carriage 73 and engages a recess 61b (see Fig. 12) in the surface of the member 61. By swinging the carriage 73 about its supporting shaft 76 and in a direction away from the cutter 43 against the action of the spring 84, the arm 91 is moved out of the recess 61b and hence out of engagement with the member 61 and the driving connection between the member 61 and the carriage 73 is thus broken.

Referring to Figure 12, the arm 91 is shown in detail. It is slidably mounted upon the side of the carriage 73 by a screw 213 passing through a slot 214 in the arm. In the upper edge of the arm are two notches 215 and 216, and projecting from the side of the carriage is a pin 217 which is adapted to coact with these notches. A suitable spring 218 fastened to a pin 219 on the carriage bears upwardly against the arm 91 and urges the arm against the pin 217. At its outer end the arm is preferably provided with a projecting flange 220 which may be engaged by the thumb to swing the arm downwardly about the screw 213 against the action of the spring 218.

In the position shown in the drawings, the notch 215 is in engagement with the pin 217. In this position the rear end of the arm 91 is in driving engagement with the sliding member 61 so that the carriage 73 partakes of the movement of the member 61. By depressing the flange 220 and sliding the arm 91 to the left, as viewed in Figure 12, the notch 216 is moved into engagement with the pin 217. This moves the arm 91 so that the end thereof does not engage the member 61. By now disconnecting the spring 84 from the pin 61a, the carriage may be moved manually back and forth along its supporting rod 76. Thus, when it is desired to cut keys without the aid of the automatic feed feature, the drive of the carriage is readily disconnected and the carriage may thereupon be manipulated manually.

As shown in Figures 1 and 2, there is provided at the left-hand end of the apparatus an arm 92 which is pivoted at its lower portion upon a supporting shaft or rod 93 rigidly supported upon the base 20. This arm 92 and the parts with which it coacts are shown in detail in Figures 5 and 6, the arm being shown in operative position in Figure 5 and in inoperative position in Figure 6. This arm is provided in its upper edge with a sloping slot 94 which is adapted to engage a pin or projecting lug 95 on the side of the carriage 73. When the arm is inoperative, as shown in Figure 6, it is swung downwardly and rests at its outer end upon the surface of the base 20. When moved upwardly to the position shown in Figure 5 the slot 94 engages with the pin 95, and the carriage 73 when swung outwardly about its supporting shaft 76 and away from the cutter 43 is thereby locked in the outward position shown in Figure 5, against the action of the spring 84.

In addition to thus moving the carriage 73 away from the cutter and holding the carriage in this position, the arm 92 is provided with a pair of projecting lugs 96 and 97 which serve as guides to aid in properly positioning the key blank 77 and the guide key 78 in their respective clamping devices 79 and 81, so that they will be properly relationed lengthwise of the carriage with respect to the cutter 43 and the guide 83 respectively. In Figures 3 and 4 the lugs 96 and 97 are shown in operative relation to the key blank 77 and the guide key 78 with which they respectively coact. It will be seen that these two lugs provide shoulder stops or abutments against which the shoulders 77b and 78b of the key blank and guide key may be moved.

The clamping devices 79 and 81 are preferably substantially identical so that one only need be described in detail. In Figures 7, 8 and 9 there are shown enlarged detail views of one of these clamps. The clamp comprises a lower member 221 which is supported upon the carriage 73 and preferably interfitted therewith, as shown at 222, and an upper member 223. Between the two jaw portions 221a and 223a of these two members the key, such as 77, is adapted to be clamped. The part 221 has a shoulder 224 extending along the key clamping surface thereof, and this shoulder of the clamping device adapted to aline and hold the key blank is exactly parallel to the corresponding shoulder of the clamping device adapted to hold the guide key or master key. Thus, when the keys are positioned in the clamping devices with their rear edges firmly up against these shoulders 224, the key blank and the master key are in proper parallel relation and the cutting of the key blank will be done accurately.

Threaded into the carriage 73 is a post 225 which extends upwardly through the part 221 and through an enlarged opening in the part 223 and which is provided at its upper end with a thumb nut 226. By threading the thumb nut downwardly along the post 225, the member 223 is forced downwardly toward the member 221 to clamp the key.

On the upper surface of the upper part 221 is formed a longitudinal ridge 227 which is preferably wedge-shaped as shown. In the lower surface of the member 223 is formed a longitudinally extending groove 228 which is parallel to the ridge 227 and which is adapted to mate substantially therewith. At the side opposite the clamping portions 221a and 223a the members 221 and 223 are connected, preferably by a leaf spring 229. This spring is secured to the lower member 221 as by a screw 230 and passes upwardly over a pin 231 extending between a pair of spaced flanges 232 resting on the upper surface of the part 223. After passing over the part 231, the end portion of the spring 229 curves downwardly to the left, as viewed in Figures 7 and 8, entering a slot 233 in the part 223 and bearing against a curved surface 234 thereof. This spring, in addition to detachably connecting the parts 221 and 223, thus urges the part 223 to the left, and when the thumb nut 226 is loosened, the member 223 assumes a position such as that shown in Figure 7 relative to the member 221. When the thumb nut is loosened, the spring urges the member 223 toward the cutting tool or toward the guide, as the case may be, this movement between the member 223 and the member 221 being permitted by the enlarged opening in the member 223 through which the post 225 passes.

When the key such as 77 is inserted, the parts are in a position such as that shown in Figure 7, it being noted that the spring 229 has moved the jaw member 223ª beyond (to the left as seen in Fig. 7) the coacting jaw member 221ª and that the lower portions of the inclined surface 228ª has ridden up along the inclined surface 227ª of the ridge 227. Now when the thumb nut 226 is threaded downwardly to clamp the key, the surface 227a of the ridge 227 coacting with the surface 228ª of the groove 228 causes a two-fold movement of the member 223 relative to the member 221; these coacting surfaces effect a drawing of the member 223 to the right (as viewed in Figs. 7 and 8) and a movement of the clamping part or jaw member 223a toward the shoulder 224. As this action takes place, the part 223a has achieved a grip upon the surface of the key 77 and the result is that the key is moved inwardly (to the right) as the clamping device is tightened up and is by this inward movement drawn firmly against the shoulder 224 when the nut 226 has been threaded down to its final clamping position, as shown in Figure 8.

The construction just described is of distinct advantage in making certain that the key will be always clamped in the exactly correct position and in always ensuring the proper relation between the positioning of the key blank and the positioning of the guide key. The keys are clamped in position accurately and dependably with the greatest ease and the convenience afforded results in a very substantial saving in time, the above-described action avoiding the necessity of exercising care and skill in putting the key blank and master key in their respective clamping devices and also avoiding the necessity of correcting inaccuracies in positioning of the key or key blank.

When the arm 92 is moved upwardly (Fig. 5) to operative position, thereby moving the carriage 73 away from the cutter 43, it will be seen that the arm 91 moves out of recess 61ᵇ and its driving connection with the member 61 is interrupted. Therefore the drive of the carriage 73 cannot be started until the arm 92 is moved downwardly into inoperative position. The apparatus is thus safeguarded, and damage to the lugs 96 and 97 or disrupting of the clamped keys which might occur by the operative carelessly starting the drive of the carriage without moving the arm 92 out of operative position, is effectively avoided.

Referring now to Figures 5 and 6, and also to Figure 2, the arm 92 which locks the carriage 73 in its inoperative position, has formed thereon a tubular part 92a through which the supporting rod 93 passes. Projecting from this part 92a is a projecting flange or web 92b which is cut away at its left-hand end adjacent the arm 92, as shown at 92c in Figure 2. This projecting web 92b prevents the arm 92 from being raised from the position shown in Figure 6 to its operative position shown in Figure 5, except when the carriage 73 is at the end of its stroke to the left and in the position shown in Figure 2, when the leg 74 can clear and by-pass the end 92c of member 92b. When the carriage moves to the right the leg 74 thereof comes opposite the flange 92b and, if it is now attempted to raise the arm 92, the web 92b swinging therewith strikes the leg 74 and prevents the arm from being lifted. Thus, the gaging means which this arm 92 provides cannot be utilized except when the carriage 73 is at its extreme left-hand position. This insures that when a key is adjusted into the clamping device with the aid of the gaging arm 92, the carriage is in proper position to properly coact with the gaging arm.

In the operation of cutting a key blank of the cylinder type such as the key blank 77 shown in Figure 3, the parts are initially positioned as shown in Figures 1 and 2 of the drawings. The cutter 43 is rapidly rotated by its driving connection with the motor 21. The cam 55 is so positioned that the member 61 and hence the carriage 73 in driving connection therewith are at their extreme left positions. The recess 70 in the cam 55 is in registry with the roller 69 on the member 63 and the clutch member 52 is thus held in position of disengagement from member 51. The operator draws the carriage 73 (see Figure 5) outwardly and moves the arm 92 upwardly (leg 74, as will be clear from Figure 2, clearing the end portion 92c of flange member 92b), arm 92 coacting with pin 95 locking the carriage in this outwardly drawn position against the action of the spring 84. This outward movement of carriage 73 also disengages arm 91 from member 61 (see Figure 5). The operator then clamps the guide key 78 in the clamping device 81 with the shoulder 78b thereof properly up against the lug 97, and clamps the key blank 77 in the clamping device 79 with the shoulder 77b properly up against the lug 96. In each instance, the inward movement of the upper clamping jaw 222ª (see Figures 7 and 8) causes an inward drawing of the key or key blank to solidly aline the back edge of the latter against the shoulder 224. The arm 92 is then moved downwardly to inoperative position, permitting the carriage 73 to move inwardly, the arm 91 thereon entering into driving engagement with the member 61. The operator then depresses the button 207 thereby swinging the member 203 in clockwise direction about the pivot 205 (see Figure 2) and this movement of the member 203 moves the member 63 in a direction to the right, as viewed in Figures 1 and 2, thereby moving clutch member 52 (see Figure 11)

into engagement with clutch member 51 and thus setting the cam 55 in rotation; the above-mentioned movement of the member 203 also causes the part 208 thereof to be brought into registry with the notch 210 of the spring latch 200, the latter springing into locking position, as shown in Figure 1.

The inter-engagement of the two clutch members sets the cam 55 in rotation and thus starts the movement of the carriage 73 to the right, as viewed in Figures 1 and 2. The initial movement of rotation of the cam 55 moves the recess 70 of the cam 55 out of juxtaposed relation to the roller 69. As soon as the carriage reaches the end of its movement in right-hand direction pin 61a engages with the beveled portion 211 of the latch 200 and continued movement of the carriage and hence of the pin 61a to the right swings the latch 200 in clockwise direction, as viewed in Figure 1, and thus disengages the latch 200 from the part 208 of the member 203, the parts assuming the position shown in Figure 1a from which it will be noted that the cam roller 69 moves slightly to the left and into engagement with the end face of the cam 55 thereby continuing to hold the clutch members in inter-engagement. The carriage 73 then moves to the left and upon substantially completing its traverse in left-hand direction the rotation of the cam 55 brings the recess 70 again into juxtaposed relation to the roller 69, permitting the latter to move to the left, as viewed in Figure 2, under the urge of the springs 67 and 68, and thus disengaging clutch member 52 from member 51; the rotation of the cam 55 and the movement of the carriage 73 are thus halted, it being noted that the parts are left in such a position that a subsequent actuation of the button 207 (see Figure 1a) re-commences the above-described cycle.

During this movement of the carriage the surface 78a of the guide key 78 moves along the edge 83a of the guide 83, the carriage being urged inwardly by the spring 84. As the carriage moves along, it swings inwardly and outwardly about its supporting shaft 76 in accordance with the depth of the depressions in the surface or edge of the guide key 78. The key blank 77 partakes of this in and out movement as it moves across the cutter 43. The shape of the surface 78a of the guide key is thus accurately reproduced in the edge 77a of the key blank. During the operation, the key blank receives two cuts, moving relative to the cutter to the right and then back again to its initial position. As the key blank moves to the right it is given what might be termed a roughing cut by cutter 43 and as it moves back to the left it is given what might be termed a finishing cut. The shape of the guide key 78 is thus faithfully and dependably reproduced in the key blank 77 as well as expeditiously and with the greatest accuracy.

It may here be pointed out that the traversing movement of the carriage 73 as above described may be interrupted at will and at any point in the path of travel of the carriage; this may be accomplished by manually swinging the carriage 73 in a direction away from the apparatus, thereby moving the member 91 out of the recess 61b in the member 61.

Referring now again to Figure 1, as was earlier described herein, the shaft 40 (shown at the right-hand portion of Figure 1) is driven through a train of gearing from the motor 21 and its drive may be thrown in or out through the medium of the clutch 30. This shaft 40 is supported in suitable bearing supports 100 and 101 and at its right-hand end carries a circular cutting tool 102 which is clamped in position upon the reduced end portion of the shaft and against the shoulder 103 by means of a nut 104. The cutter 102 may thus be rotated at high speed by the shaft 40 and is removable by means of the nut 104 for the purpose of substituting other cutting tools. This cutter 102 is adapted for cutting what are known as sideward notches in keys of the barrel type. In Figures 30 and 31 there is shown a key 108 of this type comprising what are known as the barrel portion 105 and the bit portion 106 having therein a sideward notch or groove 107. In order to cut this sideward notch 107, a key such as 108 is supported beneath the cutter 102, as is shown in Figure 17, by a suitable clamping device indicated generally by the numeral 109. This clamping device and its mounting are not shown in detail herein; preferably the construction, mounting and adjustments of the clamping arrangement 109 are the same as the corresponding parts of the machine described in my co-pending application hereinbefore mentioned.

Referring again to Figure 1 of the drawings, between the two bearing supports or uprights 100 and 101 is rotatably supported a member in the nature of a turret or spider 121 having a plurality of radially projecting arms, the arms in this instance being four in number and two thereof, 121a and 121b being visible in section in Figure 1. Each of these four arms carries one of a plurality of cutting tools which are adapted to be brought into position one at a time to operate upon a key blank carried in a clamping device indicated generally by the numeral 122 as will presently be described.

The rotatable member 121 is conveniently mounted about the shaft 40, the shaft 40 passing therethrough as shown in Figure 1. As also shown in this figure, the member 121 is positioned so that the cutting tool 123 carried by the arm 121b is in position to operate upon a key blank clamped in the clamping device 122. The arm 121a, spaced 180° from the arm 121b, carries a cutting tool 124 of a type different from the tool 123 and adapted to perform upon the key blank a different cutting operation. The tool 123 is fixed upon a shaft 123a, being clamped against a shoulder 123b thereof by means of a nut 125. The shaft or spindle 123a is rotatably supported in the arm 121b and at its left-hand end is provided with a pin 126 passing therethrough and secured therein. Shoulder 123b at one end and a nut 165 at the other end prevent longitudinal movement of the shaft 123a relative to its bearing.

When the member 121 is in the position shown in Figure 1, the left-hand end of the spindle 123a is in position to coact with a clutch collar 127 which is mounted upon the right-hand end of the shaft 35. The collar 127 is splined to the shaft 35 so that it rotates therewith and is slidable along the end portion of the shaft 35 toward and away from the spindle 123a. In the position shown in the drawing the collar 127 is moved to the left. When the collar 127 is moved to the right it embraces the end portion of the spindle 123a and the projecting ends of the pin 126 enter a diametrical slot 128 of the collar. This slot is suitably notched as indicated so that when the collar is moved to embrace the end portion of the spindle 123a and the parts are then rotated, a secure driving connection is had. The clutch collar 127 with the coacting pin 126 thus forms a detachable driving connection between the shaft 35 and the spindle 123a carrying the cutting tool 123. When the collar 127 is moved into position of driving engagement the cutter 123 is rapidly rotated directly from the shaft 35.

Referring now to Figure 13, there is shown a preferred means for shifting the clutch collar 127 along the shaft 35 and into and out of engagement with the spindle 123a or with the other spindles mounted in the spider 121. The clutch member is provided with a peripheral groove 127a which is embraced by an upstanding lever 236. This lever 236 is pivoted at its lower end to the surface of the frame or base 20, for example by means of a suitable bracket 237. The clutch member may be manipulated very conveniently by simply moving the projecting upper end of the lever 236. It may be here mentioned that the lever 23a (Figure 1) which is provided for shifting the clutch 30, is preferably constructed and operated in the same manner.

The cutting tool 124 is fixed upon a shaft or spindle 129 which is rotatably carried in the arm 121a and which is provided with means identical with those just described in connection with the spindle 123a for driving connection with the clutch collar 127. The cutting tool 124 may be brought into position to operate upon the key blank held in the clamping device 122 by simply rotating the member 121 until the spindle 129 comes opposite the collar 127. The drive of the cutter 124 may then be connected as was the drive of the cutter 123.

Referring to Figure 2 of the drawings, the remaining two arms 121c and 121d of the member 121 are shown. The arm 121c is provided with a spindle 130 shown as carrying a cutting tool 131, and the arm 121d is provided with a spindle 132. These spindles 130 and 132 are provided with means identical with that of the spindles 123a and 129 for forming a driving connection with the collar 127 on the shaft 35. The cutting tools carried by the spindles 123a, 129, 130 and 132 are removable and replaceable by other cutting tools by simply removing the nuts 125 which hold the respective cutting tools in place upon the spindles.

Referring again to Figure 1, the right-hand end of each of the spindles 123a, 129, 130 and 132 is provided with an axial recess 166 which is adapted to receive a pin 133. This pin is slidably supported in the upright 101 and on the side of the axis of the member 121 diametrically opposite the collar 127 on shaft 35. The pin 133 is urged to the left by a spring 134 and is provided with a head 135 on the right-hand side of the upright 101 whereby the pin may be manually withdrawn from a recess 166 and against the action of the spring. This pin 133 serves in a restraining capacity and serves to steady the member 121, preventing rotation of the member about its axis while the individual tools are performing their cutting operations upon the key blank. The restraining pin coacts with the spindle which is diametrically opposite the spindle carrying the cutting tool which is performing its work. Thus, as shown in Figure 1, the pin 133 is in registry with the recess 166 of the spindle 129 while the spindle 123a is in operative position.

It will thus be seen that a variety of sizes or shapes of cutting tools may be carried by the member 121 and that each of these tools is in readiness to be brought instantly into position to be driven and to operate upon the key blank clamped in the clamping device 122. When a tool is operating upon a key blank the tool is dependably driven directly from the shaft 35 and, moreover, the turret member or spider 121 is dependably held in the position desired.

Considering now more particularly the mounting of the clamping device 122, this is mounted upon a carriage 136 which is shown in Figure 2 and more in detail in Figures 17 and 22. The carriage 136 is slidable longitudinally upon a shaft 139 which it embraces at its lower end. The shaft 139 is mounted in the base 20 beneath the upper surface thereof and the carriage projects downwardly through a slot 168 in the base surface. The carriage 136 is thus movable back and forth along the shaft 139 in a direction parallel to the axes of rotation of the cutting tools carried by the spider 121 and, moreover, the carriage may be swung about the axis of the shaft 139 toward and away from the cutting tool.

Referring now to Figure 17 and also to Figure 22, the carriage 136 is more clearly shown. It comprises in effect two portions which are rigidly joined together, one portion carrying the clamping device 122 in which is held the key to be cut, and the other portion, preferably inclined outwardly at an angle as shown, carrying a second clamping device 142 in which is supported the guide key or master key the shape of which is to be reproduced in the key blank carried by the device 122. In Figure 17 the carriage is shown in operative position advanced toward the cutting tool 123, and in Figure 22 the carriage is shown drawn back and in inoperative position. A master key or guide key 144 of the barrel type is shown clamped in the clamping device 142 and a key blank 141 also of the barrel type is shown clamped in the clamping device 122 in readiness to be operated upon by the cutters carried in the spider 121. As will be understood, this apparatus being described is adapted for cutting the key blank 141 to produce therein an exact duplicate of the guide key 144.

Each of the different cutters carried in the spider 121 is adapted for cutting a different notch or form of notch in the key blank 141. For example, as is illustrated in Figures 17 and 22, a cutter such as the cutter 123 may be employed to trim and square off the ends of the bit 145 of the key blank. Referring to Figures 27–29, a cutter such as the cutter 123, or one having a wider or narrower face as may be required, is employed to cut in the bit 145 of the key blank notches corresponding to the notches 147a in the bit 147 of the guide key. In order to cut the notches in the key blank corresponding to the notches 147b of the guide key, a cutter such as the cutter 124 is employed (illustrated in Figure 14). This cutter has side cutting flanges 124a and 124b for cutting in a direction substantially parallel to the axis of rotation of the cutter. For each type of cutter which is mounted in the spider 121, there is required a corresponding gage or guide to coact with the guide key or master key. For example, in Figure 27 there is shown a guide 240 which coacts with the guide key 144 when the cutter 123 is employed. In cutting a notch corresponding to one of the notches 147a, for example, the carriage 136 is moved along its supporting rod 139 until the guide 240 is positioned opposite the notch of the master key which it is desired to reproduce in the key blank 141. Thereupon, the carriage is swung inwardly about its support 139, carrying the bit 145 of the key blank into engagement with the cutter 123, and this movement and cutting of the notch are continued until the guide 240 strikes the base of the notch which it has entered in the bit 147 of the master key. In cutting a notch such as 147b of the master key a guide such as 241 (see Figure 14) is employed, corresponding in shape to the cutter 124. The carriage is swung inwardly until the notch 147b of the master key comes into registry with the guide 241 and thereupon the carriage is moved lengthwise of its support to start the cutting action of portion 124a of the cutter until the guide 241 strikes the base of the notch, whence cutting ceases. It will thus be seen that a variety of forms of guides is required for cooperation with the master key.

Referring now to Figure 18, these guides for cooperating with the master key 144 are mounted upon a rotatable member 242 adjacent to the supporting device 142 so that they may be brought one at a time into position to cooperate with the master key 144. The rotatable member 242 preferably takes the form of a disk of substantial axial thickness, and the gages or guide members are removably secured to the periphery of this disk by means of screws such as 243, the periphery of the disk being notched as shown in Figure 24, to receive and firmly hold the guide members.

The disk 242 is rotatably mounted upon a spindle 244 (Figures 18 and 23) which is carried in the upper end of a bracket 245. This bracket 245 is pivoted at its lower end in a lug 246 and by means of a pivot pin 247. A spring 248 urges the bracket 245 to swing about the pin 247 in a counter-clockwise direction, as viewed in Figure 18, and the bracket has a forwardly projecting arm 249 which limits this swinging movement as will be described hereinafter.

The rotatable disk 242 carrying upon its periphery the various guide members such as 240, is shown clearly in Figures 23 and 24. In the periphery of the disk, in addition to the notches 242a for receiving the guides, are a plurality of equally spaced notches 250. There is provided a notch 250 diametrically opposite each of the guide members. For coacting with the notches 250 there is provided a lever 251 which is pivoted in the bracket 245 at 252, as shown in Figure 23, and which is yieldingly held in the position shown in the drawing by a spring 253. This lever 251 locks the disk 242 in the position to which it may be turned about its spindle 244. In the position shown in Figures 23 and 24, the guide 240 has been brought into operative relation to the master key 144, and the locking lever 251 thus rests in the slot 250 which is diametrically opposite the guide 240. In order to bring another of the guides into position to coact with the master key, the lock 251 is released by simply swinging it outwardly away from the periphery of the disk, the disk is turned to bring the desired guide into the position now occupied by the guide 240 and thereupon the lever 251 is permitted to snap into the notch to lock the disk against further turning.

This mounting of the various gages, as just described, is distinctly advantageous. When the spider 121 is turned to bring a new cutting tool into position to operate upon the key blank, the appropriate guide may be brought into position and locked to coact with the master key with the greatest convenience. The operator is not required to remove parts from the machine and replace them with other parts, nor to loosen and tighten nuts or screws, all of which consumes valuable time. The guides carried by the disk 242 are removable and replaceable by other guides if it is found necessary to suit requirements of practice or to change the cutting tools carried by the spider 121.

Referring to Figures 18 and 21, the spring 248 tends to swing the bracket 245, which carries the gages, outwardly or forwardly toward the clamping device 142 for the master key. The front end of the arm 249 projects beneath an overhanging part 254a of a bracket 254 which projects upwardly from the base 20. This bracket 254 with the parts associated therewith, coacting with the arm 249, limit the swinging movement of the bracket 245 about its pivot 247.

An adjustable set screw 255 in the overhanging part 254a limits the swinging movement of the bracket 245 inwardly. In the upright 254 is rotatably mounted a pin 256 (Figures 19 and 20), the inner end of which carries a cam 257 and the outer end of which is provided with a thumb lever 258 by means of which the pin 256 and the cam 257 may be turned. In the position shown in Figure 19 the pin 256 is turned so that the low part of the cam 257 faces the end portion of the arm 249, and in Figure 20 the pin 256 is turned so that the high portion of the cam faces the arm 249. In the position shown in Figure 19, and also in Figures 18 and 21, the arm 249 is permitted a degree of clearance determined by the adjustment of the set screw 255, thereby permitting a limited rotation of the bracket 245 about its pivot 247. The spring 248 normally holds the parts in the position shown in Figure 21. In the position of the parts shown in Figure 20, the arm 249 is tightly clamped between the set screw 255 and the cam 257 so that the bracket 245 is locked in position against any swinging movement about its pivot 247.

The cam 257 is turned to the position shown in Figures 18, 19 and 21, by means of the thumb lever 258, when the machine is being employed to cut notches, such as the notches 147a (Figure 27), or to trim off and square the ends of the bit of the key blank. The carriage 136 normally rests in the position shown in Figure 22 by gravity, being forwardly about its support 139 so that the master key 144 is away from the guides and the key blank 141 is away from the cutter. The bracket 245 carrying the gage is held by the spring 248 in the position shown in Figure 21. The use of the apparatus in cutting a notch such as one of the notches 147a is now as is illustrated in Figures 27, 28 and 29. The carriage 136 is moved along its support 139 until the notch which it is desired to reproduce in the key blank 141 comes opposite the guide such as the guide 240, it being now understood that guide 240 has been appropriately selected from the various guides carried by the rotatable member 242. The carriage is then swung inwardly, carrying the master key toward the guide and carrying the key blank toward the cutter. At this point it is highly desirable that the notch of the guide key which is to be reproduced may be engaged with the guide before the key blank comes into engagement with the cutter. This is permitted by the clearance allowed by the low part of the cam 257 for permitting the bracket 245 to swing about its pivot. The forward movement of the gage permitted by this clearance brings the gage to such position that it may be engaged with the notch which is to be reproduced, before the key blank comes into contact with the cutter. This is illustrated in Figure 28 wherein the guide 240 has entered the notch in the guide key and the bit of the key blank 141 has not touched the cutter 123. This prevents marring the edge of the key blank and avoids the possibility of cutting at the wrong place or before the gauge has accurately positioned the carriage along the shaft 139. After the carriage has been moved inwardly until the parts are brought to a position approximating that shown in Figure 28, further inward movement swings the bracket 245 about its pivot 247 until the arm 249 comes against the set screw 255, the cutting of the notch in the key blank taking place during this latter movement as is illustrated in Figure 29.

This "preliminary feel" as it may be termed is a feature of real practical value. The carriage may be adjusted into the proper position for accurate cutting with the greatest convenience and without danger of marring or spoiling the key blank by the cutter striking it at the wrong point. The guide may be actually registered with the notch desired to be reproduced before the cutter strikes the key blank. Greater accuracy is achieved and with a saving of time.

In cutting notches such as the notches 147b (Figure 14) by means of a cutter such as the cutter 124, the appropriate guide, namely, guide 241, is selected by rotation of member 242, for coaction with the cutter 124, but this feature of permitting the guide to swing forwardly is not employed. When cutting this type of notch the guide is fixed in position. This is accomplished with the greatest convenience by simply swinging the cam 257 through 180° to the position shown in Figure 20, by means of the thumb lever 258.

By way of illustration I have shown in Figure 24 other possible forms of guides at 281 and 282, each adapted for coaction with a different cutter. And by reference to Figure 24 it will be seen that I have illustratively shown the guides 281, 282 and 240 of different thicknesses as illustrative of guides which may be selectively positioned for coaction with cutters of respectively similar thicknesses.

The clamping devices 122 and 142 are adapted for holding various types of keys and the cutters carried by the spider 121 are adapted for operating upon various types of keys in addition to keys of the barrel type, the cutting of which has just been described. For example, this apparatus may be employed to cut flat keys such as shown in Figure 15. In this figure there is shown a master key 260 cooperating with the guide 240 and a key blank 261 being operated upon by the cutter 123. The two clamping devices 122 and 142 are preferably substantially alike so that one only need be described in detail. Moreover, the clamping devices are of such construction and are so mounted that, of the various jaw members provided thereby for gripping different styles or types of keys, any one pair of jaw members may be selectively positioned to present the style of key which it grips to a selectively positioned tool of the various cutting tools provided.

Referring to Figure 22, the clamping device 122 is seen to comprise two clamping members 161 and 162 through which passes a threaded post 163 which is secured in the carriage 136 and projects upwardly therefrom. This post 163 is provided with a wing nut 164 which is threaded down along the post against the member 162 to grip the key between the clamping members. For different kinds and shapes of keys different clamping arrangements are desirable and for this reason the clamping device has four sides, any one of which may be brought into position to face the cutters and hold the key to be operated upon.

As shown in Figure 23, the surface of the carriage 136 on which the clamping device is positioned is provided with a longitudinal groove 165 and with a transverse groove 166. The bottom of the clamping member 161 (Figure 25) is provided with a projection 167 adapted to mate with either the groove 165 or the groove 166. The corresponding faces of the members 161 and 162 are preferably correspondingly numbered 1, 2, 3 and 4, as shown in Figure 25. By registering the projection 167 with the groove 165, either the side 1 or the side 3 may be brought to face the cutter, and by registering the projection 167 with the groove 166, either the side 2 or the side 4 may be brought to face the cutter. Each one of these sides provides a different type of clamping device. The clamping members 161 and 162 are preferably interfitted as by a projection 168 and groove 169, so that they are properly positioned with respect to one another when placed together and are properly guided when the member 162 is moved to and from clamping position by the thumb nut. Referring to Figure 25, it will be seen that the centrally projecting member 168 is cut away or recessed as at 161c and 161e so that when either side 2 or 4 is brought to face the cutter these recesses can accommodate portions of the key or key blank that may be clamped between the members 161 and 162 and positioned therebetween in a direction transversely of the projecting member 168.

When keys of the barrel type are being cut, for example as shown in Figures 14 and 17, the cylindrical end portion thereof from which the bit projects is clamped in the clamping device to position the bit for operation thereon by the cutters. In order to more securely clamp this cylindrical part of the key, referring to Figure 25, the clamping surfaces 161a and 162a, which are adapted for clamping barrel keys, are preferably made inclined, the lower surface 161a sloping downwardly from its outer edge and the upper surface 162a sloping upwardly from its outer edge. When the cylindrical key portion is clamped between these two clamping surfaces they tend to draw the key in against the body of the clamping device so that the cylindrical key portion is gripped at three spaced points about its surface, as may be seen from Figure 22, and a firm gripping action is had.

As shown in Figure 25, the surfaces 161a and 162a are roughened preferably by corrugations or teeth extending longitudinally thereof. When the cylindrical key portion is clamped these corrugations or projecting teeth bite into the surface of the key and securely grip the key against possibility of its turning about its longitudinal axis as it is operated upon by the cutters. This is of particular importance when the bit of the key is being operated upon by a cutter such as the cutter 124, as shown in Figure 14. This cutter exerts a strong tendency to turn the key about its longitudinal axis, and if such turning occurs while the cutter is operating, as shown in Figure 14, there is a grave danger of breaking off the portion 124a of the cutting tool. The teeth on the clamping surfaces 161a and 162a firmly gripping the cylindrical key portion, prevent any turning of the key under the severe torsional force exerted by the cutter 124 and thus do away with the danger of ruining the cutter and perhaps other injury to the machine.

Referring again to Figure 25, the clamping surfaces 161b and 162b are also preferably roughened by longitudinally extending corrugations or teeth. These clamping surfaces 161b and 162b are adapted for clamping a flat key as shown in Figure 16, and the roughened surfaces, biting into the key surface, independently hold such a key against any twisting force exerted thereon by the cutters.

From the foregoing, it will be seen that there is herein provided a machine which achieves the objects of this invention and accomplishes many advantages of practical importance. The machine is capable of operating with rapidity and accuracy and, furthermore, it is adapted for cutting substantially all kinds of keys. Adjustments of the machine for taking different kinds of cuts or for arranging the parts to act upon different types of keys, are accomplished with the greatest convenience and without loss of time.

As many possible embodiments may be made of the above invention, and as many changes might be made in the embodiment above set forth, it is to be understood that all matter hereinbefore set forth or shown in the accompanying drawings, is to be interpreted as illustrative and not in a limiting sense.

I claim as my invention:

1. In apparatus of the class described, in combination, a movable support, means upon said support adapted to hold a key blank, means upon said support adapted to hold a master key, cutting means adapted to operate upon said key blank, a plurality of guides any one of which is adapted to coact with said master key to control a cutting operation of said cutting means upon a key blank, and movable means mounting said guides to enable them to be brought one at a time into operative relation to said master key.

2. In apparatus of the class described, in combination, a movable support, means upon said support adapted to hold a key blank, means upon said support adapted to hold a master key, cutting means adapted to operate upon said key blank, and a device adjacent to said holding means for said master key adapted to carry a plurality of guides, said device being rotatable to position any one of the guides carried thereby in operative relation to said master key.

3. In apparatus of the class described, in combination, a movable support, means upon said support adapted to hold a key blank, means upon said support adapted to hold a master key, cutting means adapted to operate upon said key blank, and a device adjacent to said holding means for said master key having mounted thereon a plurality of guides, any one of which is adapted to coact with said master key to control a cutting operation of said cutting means upon a key blank, said device being movable to position any one of said guides in operative relation to said master key, and means removably mounting said guides upon said device.

4. In apparatus of the class described, in combination, a movable support, means upon said support adapted to hold a key blank, means upon said support adapted to hold a master key, cutting means adapted to operate upon said key blank, a rotatable disk mounted adjacent to said holding means for said master key, and a plurality of guides mounted upon the periphery of said disk and adapted to be brought by rotation of said disk one at a time into operative relation to said master key.

5. In apparatus of the class described, in combination, a movable support, means upon said support adapted to hold a key blank, means upon said support adapted to hold a master key, cutting means adapted to operate upon said key blank, a rotatable disk mounted adjacent to said holding means for said master key, a plurality of spaced recesses in the periphery of said disk, and a plurality of guides removably held in said respective recesses, said guides being adapted to be brought by rotation of said disk one at a time into operative relation to said master key.

6. In apparatus of the class described, in combination, a movable support, means on said support adapted to hold a key blank, means upon said support adapted to hold a master key, a plurality of cutting tools, means mounting said cutting tools to enable them to be brought one at a time into operative relation to said key blank, a plurality of guides, each of which is adapted to control the cutting action of one of said cutting tools, and means mounting said guides to enable them to be brought one at a time into operative relation to said master key.

7. In apparatus of the class described, in combination, a movable support, means on said support adapted to hold a key blank, means upon said support adapted to hold a master key, a plurality of cutting tools, a rotatable device upon which said cutting tools are mounted and adapted to be rotated to bring said tools one at a time into operative relation to said key blank, a plurality of guides, and a rotatable device upon which said guides are mounted adapted to be rotated to bring said guides one at a time into operative relation to said master key.

8. In apparatus of the class described, in combination, a movable support, means upon said support adapted to hold a key blank, means upon said support adapted to hold a master key, cutting means adapted to operate upon said key blank, a plurality of guides any one of which is adapted to coact with said master key to control a cutting operation of said cutting means on a key blank, means mounting said guides to enable them to be brought, one at a time into operative relation to said master key, and means mounting said last means for movement of limited magnitude toward and away from said support.

9. In apparatus of the class described, in combination, a movable support, means upon said support adapted to hold a key blank, means upon said support adapted to hold a master key, cutting means adapted to operate upon said key blank, a rotatable disk mounted adjacent to said holding means for said master key, a plurality of guides mounted upon the periphery of said disk and adapted to be brought by rotation of said disk one at a time into operative relation to said master key, and means mounting said disk for movement of limited magnitude toward and away from said support.

10. In apparatus of the class described, in combination, a cutting tool, a carriage having means adapted to hold a key blank for operation thereon by said tool, means mounting said carriage for movement back and forth past said tool, means for causing relative movement between said cutting tool and said carriage in a direction to cause said tool to cut a key contour in said key blank, means from which said carriage is adapted to be driven, a disruptable driving connection between said carriage and said last means, and means for disrupting and maintaining disrupted said driving connection, said mounting means being constructed so that said carriage may be moved and manipulated manually for cutting a key contour.

11. In apparatus of the class described, in combination, a cutting tool, a carriage having means adapted to hold a key blank for operation thereon by said tool, means mounting said carriage for movement back and forth past said tool, means for causing relative movement between said cutting tool and said carriage in a direction to cause said tool to cut a key contour in said key blank, a driven member moving in a path substantially parallel to that of said carriage, a driving connection between said member and said carriage adapted to be disconnected, and means for disconnecting and holding disconnected said driving connection, said mounting means being constructed to permit said carriage to be moved and manipulated manually for cutting a key contour.

12. In apparatus of the class described, in combination, a cutting tool, a carriage having means adapted to hold a key blank for operation thereon by said tool, means mounting said carriage for movement back and forth past said tool, means for causing relative movement between said cutting tool and said carriage in a direction to cause said tool to cut a key contour in said key blank, a driven member moving in a path substantially parallel to that of said carriage, and a driving connection between said member and said carriage comprising a device mounted upon said carriage and adapted to engage a part of said member, said device being movably mounted upon said carriage and adapted to be drawn out of engagement with said member to permit manual movement of said carriage.

13. In apparatus of the class described, in combination, a cutting tool, a carriage having means adapted to hold a key blank for operation thereon by said tool, means mounting said carriage for movement back and forth past said tool, a driven member moving in a path substantially parallel to that of said carriage, a spring connected to said member and urging said carriage toward said tool, and a device upon said carriage for connecting said carriage to be driven by said member, said spring and said device being detachable from said member to permit said carriage to be moved past said tool manually and independently of said member.

14. In apparatus of the class described, in combination, a cutting tool, a carriage having means adapted to hold a key blank for operation thereon by said tool, means mounting said carriage for movement past said tool, means for causing relative movement between said cutting tool and said carriage in a direction to cause said tool to cut a key contour in said key blank, driving means, a clutch for connecting said driving means to drive said carriage, spring means tending to disengage said clutch, a latch for holding said clutch in position of engagement, and means adapted upon predetermined movement of said carriage to release said latch.

15. In apparatus of the class described, in combination, a cutting tool, a carriage having means adapted to hold a key blank for operation thereon by said tool, means mounting said carriage for movement past said tool, means adapted to drive said carriage past said tool and back to its original position, a clutch through which said last means is driven, spring means tending to disengage said clutch, a latch mechanism for holding said clutch in position of engagement, means adapted upon predetermined movement of said carriage to release said latch, and means adapted thereupon to hold said clutch in engagement until said carriage has returned to its initial position.

16. In apparatus of the class described, in combination, a cutting tool, a carriage having means adapted to hold a key blank for operation thereon by said tool, means mounting said carriage for movement past said tool, means adapted to drive said carriage past said tool a predetermined distance in one direction and then return said carriage to its initial position, a clutch through which said last means is driven, spring means tending to disengage said clutch, a manually operated device for moving said clutch to position of engagement to start the drive of said carriage, a latch for holding said clutch in position of engagement, means adapted upon predetermined movement of said carriage to release said latch, and means adapted thereupon to hold said clutch in engagement until said carriage is returned by said drive to its initial position.

17. In apparatus of the class described, in combination, a carriage, means thereon adapted to hold a key blank, means thereon adapted to hold a master key, a cutting tool adapted to operate upon said key blank, a guide adapted to coact with said master key, means mounting said carriage for movement from a starting position past said tool and said guide, gaging means for positioning said key blank and said master key in said holding means therefor, said gaging means being movable into and out of operative position, and means adapted to prevent movement of said means into operative position when said carriage is in other than its said starting position.

18. In apparatus of the class described, in combination, a cutting tool, a carriage mounted for movement relative to said tool, and means upon said carriage for holding keys to be operated upon by said tool, said means comprising a pair of clamping members adapted to be brought together to grip a key, said clamping members having four pairs of coacting clamping portions, and being mounted upon said carriage for adjustment in position thereon to bring any one of said four pairs of portions into position to hold a key in operative relation to said tool.

19. In apparatus of the class described, in combination, a circular cutting tool having a toothed axially projecting flange about its periphery adapted for cutting notches in the side edges of the bits of keys of the barrel type, a pair of clamping members adapted to grip a cylindrical portion of the key to position the key for operation by said cutter, and means for urging said members together to grip said key, said members having longitudinally extending ridges adapted to bite into the cylindrical key surface to hold the key against axial rotation under the torsional force exerted thereon by the action of said cutter.

20. In apparatus of the class described, in combination, a cutting tool, a carriage having means adapted to hold a key blank for operation thereon by said tool, means mounting said carriage for movement relative to said tool, a carriage-driving member, means for guiding said member in a path to move said carriage relative to said tool, means forming a connection between said member and said carriage adapted to permit movement of said carriage toward or away from said tool, said connecting means including a manually movable device adapted in one position to disconnect said carriage from said member and in another position to connect said carriage to said member and means for holding said device in either of said positions.

21. In apparatus of the class described, in combination, a cutting tool, a carriage having means adapted to hold a key blank for operation thereon by said tool, means mounting said carriage for movement relative to said tool, a carriage-driving member, means for guiding said member in a path to move said carriage relative to said tool, said member having a recess, and a device movably mounted on said carriage and adapted to enter said recess or to be withdrawn therefrom.

22. In apparatus of the class described, in combination, a cutting tool, a carriage having means adapted to hold a key blank for operation thereon by said tool, means mounting said carriage for movement relative to said tool, a carriage-driving member, means for guiding said member in a path to move said carriage relative to said tool, said member having a recess, a device slidably carried by said carriage and adapted to be moved relative to the carriage to enter said recess or to be withdrawn therefrom, and means for holding said device in the position into which it is moved.

23. In apparatus of the class described, in combination, a cutting tool, a carriage having means adapted to hold a key blank for operation thereon by said tool, means mounting said carriage for movement relative to said tool, a cam for moving said carriage relative to said tool, and means forming a connection between said cam and said carriage, said means including a cam follower and a device movably mounted on said carriage and adapted in one position to engage said follower and in another position to disengage said follower.

24. In apparatus of the class described, in combination, a cutting tool, a carriage having means adapted to hold a key blank for operation thereon by said tool, means mounting said carriage for movement relative to said tool, a cam for moving said carriage relative to said tool, and means forming a connection between said cam and said carriage, said means including a guide, a member actuated by said cam and moved thereby relative to said guide, said guide extending substantially in the direction of movement of said carriage, and movable means mounted on said carriage for making detachable connection with said member.

25. In apparatus of the class described, in combination, a cutting tool, a carriage having means adapted to hold a key blank for operation thereon by said tool, means mounting said carriage for movement relative to said tool, a carriage-driving member having a predetermined path of movement relative to said cutter, means permitting movement of said carriage in a direction toward or away from said cutter, a device carried by said carriage and positioned to engage said driving member upon a predetermined movement of said carriage toward said cutter, and means adapted to permit said device to be positioned so that it will not engage said driving member upon predetermined movement of said carriage toward said cutter.

26. In apparatus of the class described, in combination, a support, a plurality of driven cutting tools of different shapes and adapted to perform different cutting operations upon the same key blank or upon key blanks of different types, means mounting said tools adjacent said support to enable said tools to be selected and brought one at a time into operative position relative to said support, means provided with a plurality of clamping portions each adapted to clamp a different type of key blank, means mounting said last-mentioned means on said support to enable said clamping portions to be selected and positioned one at a time to permit a key blank carried by a selected clamping portion to be operated upon a by a selected tool, a plurality of guides adapted to control the cutting action of said cutting tools, said guides being of different shapes and adapted for coaction with said tools as the latter perform different cutting operations upon the same key blank or upon key blanks of different types, and means mounting said guides on said support to enable said guides to be selected and positioned one at a time for coaction with a selected tool as the latter operates upon a key blank carried by a selected clamping portion.

27. In apparatus of the class described, in combination, a support, a plurality of driven cutting tools of different shapes and adapted to perform different cutting operations upon the same key blank or upon key blanks of different types, means mounting said tools adjacent said support to enable said tools to be selected and brought one at a time into operative position relative to said support, means mounted upon said support for holding a key blank and for holding a master key, a plurality of guides of different characteristics and adapted to coact with individual cutting tools as the latter operate individually upon a key blank, and means supporting said guides and adapted to permit the latter to be selectively positioned and brought one at a time into operative relation to the master key in said holding means.

28. In apparatus of the class described, in combination, a cutting tool, means for holding a key blank and for holding a master key, means mounting said tool and said holding means adapted to permit relative movement between a key blank and said tool so that the latter may operate upon the blank, a plurality of guides, and means mounting said guides to permit selection thereof at will and to permit one at a time to be brought into coacting relation to the master key held in said holding means.

29. In apparatus of the class described, in combination, a cutting tool, a carriage having means for holding a key blank for operation thereon by said tool, means mounting said carriage for movement relative to said tool, driving means for moving said carriage and having included therein a detachable driving connection, cam means for controlling said driving connection, and means for controlling said cam means.

30. In apparatus of the class described, in combination, a cutting tool, a carriage having means for holding a key blank for operation thereon by said tool, means mounting said carriage for movement relative to said tool, driving means for moving said carirage and having included therein a detachable driving connection, cam means for controlling said driving connection, additional means for controlling said driving connection, and means controlled by the movement of said carriage for affecting one of said controlling means.

31. In apparatus of the class described, in combination, a cutting tool, a carriage having means for holding a key blank for operation thereon by said tool, means mounting said carriage for movement relative to said tool, driving means for moving said carriage and having included therein a detachable driving connection, cam means for controlling said driving connection, additional means for controlling said driving connection, means for manually actuating said last-mentioned means, and means controlled by the movement of the carriage for controlling one of said controlling means.

32. In apparatus of the class described, in combination, a cutting tool, means for holding a key blank and for holding a master key, means mounting said tool and said holding means adapted to permit relative movement between a key blank and said tool so that the latter may operate upon the blank, a plurality of guides, means movably mounting said guides adapted upon movement thereof to permit selection of one of said guides and to permit one at a time to be brought into coacting relation to the master key held in said holding means, and means for holding said movable means in position to maintain a selected guide in coacting relation to said master key.

33. In apparatus of the class described, in combination, a movable support, means upon said support adapted to hold a key blank, means upon said support adapted to hold a master key, cutting means adapted to operate upon said key blank, a device adjacent to said holding means for said master key adapted to carry a plurality of guides, said device being rotatable to position any one of the guides carried thereby in operative relation to said master key, said rotatable device having a plurality of recesses, one for each guide, and a relatively fixed member adapted to coact with one of said recesses, after rotation of said device to select a guide, to hold said device against rotation.

34. In apparatus of the class described, in combination, a cutting tool, means for holding a key blank and for holding a master key, means mounting said tool and said holding means adapted to permit relative movement between a key blank and said tool so that the latter may operate upon the blank, a plurality of guides, a relatively fixed member, a member mounting said guides and movable relative to said fixed member to permit selection at will of any one of said guides and to permit one guide at a time to be brought into coacting relation to the master key held in said holding means, and means operative only when a selected tool is brought into coacting relation to the master key for locking said movable member relative to said fixed member.

35. In apparatus of the class described, in combination, a cutting tool, means for holding a key blank and for holding a master key, means mounting said tool and said holding means adapted to permit relative movement between a key blank and said tool so that the latter may operate upon the blank, a plurality of guides, a relatively fixed member, a member mounting said guides and movable relative to said fixed member to permit selection at will of any one of said guides and to permit one guide at a time to be brought into coacting relation to the master key held in said holding means, one of said members having a plurality of recesses, at least one for each of said guides, and means carried by the other of said members and adapted to register with and enter a recess upon bringing one of said guides into coacting relation to the master key.

36. In apparatus of the class described, in combination, a support carrying a cutting tool, a support carrying means for holding a key blank for operation thereon by said tool, means mounting one of said supports for movement in the direction of the length of the key blank thereby to cause a relative traverse between said tool and said blank to take place, driving mechanism including a driving member and a mating driven member engageable with said driving member for moving said movable support to cause said traverse to take place, a movable member adapted upon movement into one position to cause engagement of said driving and driven members and upon movement into another position to cause disengagement therebetween, means adapted upon actuation of said movable member into said first-mentioned position to hold it in said position to maintain said driving and driven members in engagement and to release said movable member for movement into said second-mentioned position only after a certain relative traversing movement has taken place, means operative during said traversing movement to change the depth of cut of said tool thereby to give said key blank a key contour, and means controllable at will for preventing release of said movable member and to cause thereby continued relative traversing movement.

37. In apparatus of the class described, in combination, a support carrying a cutting tool, a support carrying means for holding a key blank for operation thereon by said tool, means mounting one of said supports for movement in the direction of the length of the key blank thereby to cause a relative traverse between said tool and said blank to take place, driving mechanism including a driving member and a mating driven member engageable with said driving member for moving said movable support to cause said traverse to take place, a movable member adapted upon movement into one position to cause engagement of said driving and driven members and upon movement into another position to cause disengagement therebetween, means adapted upon actuation of said movable member into said first-mentioned position to hold it in said position to maintain said driving and driven members in engagement and to release said movable member for movement into said second-mentioned position only after a certain relative traversing movement has taken place, means operative during said traversing movement to change the depth of cut of said tool thereby to give said key blank a key contour, means for preventing release of said movable member, and means responsive to a certain relative traversing movement for making said last-mentioned means ineffective to prevent release of said movable member.

38. In apparatus of the class described, in combination, a support carrying a cutting tool, a support carrying means for holding a key blank for operation thereon by said tool, means mounting one of said supports for movement in the direction of the length of the key blank thereby to cause a relative traverse between said tool and said blank to take place, driving mechanism including a driving member and a mating driven member engageable with said driving member for moving said movable support to cause said traverse to take place, a movable member adapted upon movement into one position to cause engagement of said driving and driven members and upon movement into another position to cause disengagement therebetween, means adapted upon actuation of said movable member into said first-mentioned position to hold it in said position to maintain said driving and driven members in engagement and to release said movable member for movement into said second-mentioned position only after a certain relative traversing movement has taken place, means operative during said traversing movement to change the depth of cut of said tool thereby to give said key blank a key contour, a latch made effective upon movement of said movable member in said first position to hold it against release, and means operative after a certain relative traversing movement has taken place to operate upon said latch and cause the latter to release said movable member.

39. In apparatus of the class described, in combination, a support carrying a cutting tool, a support carrying means for holding a key blank for operation thereon by said tool, means mounting one of said supports for movement in the direction of the length of the key blank thereby to cause a relative traverse between said tool and said blank to take place, driving mechanism including a driving member and a mating driven member engageable with said driving member for moving said movable support to cause said traverse to take place, means operative during traversing movement between said tool and said key blank for changing the depth of cut of said tool thereby to give said key blank a key contour, a part traveling with said movable support, a part positioned in the path of travel of said traveling part, one of said parts being movable by the other upon engagement therebetween, and means responsive to the movement effected when said parts come into engagement for disengaging said driving and driven members.

40. In apparatus of the class described, in combination, a support carrying a cutting tool, a support carrying means for holding a key blank for operation thereon by said tool, means mounting one of said supports for movement in the direction of the length of the key blank thereby to cause a relative traverse between said tool and said blank to take place, driving mechanism including a driving member and a mating driven member engageable with said driving member for moving said movable support to cause said traverse to take place, means operative during traversing movement between said tool and said key blank for changing the depth of cut of said tool thereby to give said key blank a key contour, a rotatable member controlling the operative relation between said driving and driven members, a part traveling with said movable support, a part positioned in the path of travel of said traveling part, one of said parts being movable by the other upon engagement therebetween, and means responsive to movement of the part moved as a result of said engagement of said two parts for making said rotatable member effective to disengage said driving and driven members.

In testimony whereof, I have signed my name to this specification this 24th day of February, 1927.

HERMAN HANSEN.